United States Patent
Spjuth et al.

(10) Patent No.: US 12,466,264 B2
(45) Date of Patent: Nov. 11, 2025

(54) BATTERY ARCHITECTURE WITHOUT LOW VOLTAGE BATTERY

(71) Applicant: Volvo Car Corporation, Gothenburg (SE)

(72) Inventors: Örjan Spjuth, Lindome (SE); Mikael Sonesson, Alingsås (SE); Sofia Lorensson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 587 days.

(21) Appl. No.: 17/652,117

(22) Filed: Feb. 23, 2022

(65) Prior Publication Data

US 2022/0274488 A1    Sep. 1, 2022

Related U.S. Application Data

(60) Provisional application No. 63/155,039, filed on Mar. 1, 2021.

(51) Int. Cl.
*B60L 3/00* (2019.01)
*B60L 50/64* (2019.01)
*B60L 53/20* (2019.01)

(52) U.S. Cl.
CPC ........... *B60L 3/0092* (2013.01); *B60L 3/0023* (2013.01); *B60L 50/64* (2019.02); *B60L 53/20* (2019.02);
(Continued)

(58) Field of Classification Search
CPC .................................................. B60L 3/0092
See application file for complete search history.

(56) References Cited

U.S. PATENT DOCUMENTS

| | | | | |
|---|---|---|---|---|
| 4,812,672 A | * | 3/1989 | Cowan | H02J 9/061 307/64 |
| 5,598,041 A | * | 1/1997 | Willis | H02J 1/108 307/64 |

(Continued)

FOREIGN PATENT DOCUMENTS

| CN | 102202929 A | 9/2011 |
|---|---|---|
| CN | 105730259 A | 7/2016 |

(Continued)

OTHER PUBLICATIONS

Communication Pursuant to Rule 94(3) EPC received for European Patent Application Serial No. 22159436.9 dated Jul. 25, 2023, 4 pages.

(Continued)

*Primary Examiner* — Tynese V McDaniel
(74) *Attorney, Agent, or Firm* — Amin, Turocy & Watson, LLP

(57) ABSTRACT

An electric vehicle battery system is provided. In some embodiments, the battery system can comprise a battery pack comprising a first battery group and a second battery group, wherein the first battery group comprises one or more battery cells and the second battery group comprises one or more battery cells. In various embodiments, the battery system can further comprise a first direct current to direct current (DC-DC) converter connected to the first battery group and to a first cluster. In one or more implementations, a second DC-DC converter can be connected to the second battery group and to a second cluster.

20 Claims, 7 Drawing Sheets

(52) U.S. Cl.
CPC ..... *B60L 2210/10* (2013.01); *B60L 2240/547* (2013.01)

(56) References Cited

U.S. PATENT DOCUMENTS

| | | | | |
|---|---|---|---|---|
| 5,654,859 | A * | 8/1997 | Shi | H02J 9/00 361/100 |
| 10,093,187 | B2 * | 10/2018 | Berels | B60R 16/04 |
| 10,293,693 | B2 * | 5/2019 | Kim | H02J 7/0068 |
| 10,730,391 | B2 | 8/2020 | Hudson et al. | |
| 10,737,586 | B2 * | 8/2020 | Alves | H02J 7/0068 |
| 10,857,956 | B2 * | 12/2020 | Kim | B60L 53/22 |
| 11,152,872 | B2 * | 10/2021 | Chen | H02M 7/5387 |
| 11,691,536 | B2 * | 7/2023 | Kwon | H02J 7/342 307/9.1 |
| 11,764,597 | B1 * | 9/2023 | Sheehy | H02J 7/0063 320/135 |
| 2013/0229049 | A1 * | 9/2013 | Larsson | F02N 11/0814 307/9.1 |
| 2013/0285459 | A1 * | 10/2013 | Jaoui | H02J 3/32 307/80 |
| 2016/0105039 | A1 * | 4/2016 | Jeon | H02J 7/00712 320/128 |
| 2016/0336767 | A1 * | 11/2016 | Zane | H02J 7/0048 |
| 2017/0005571 | A1 * | 1/2017 | Wang | H03K 5/24 |
| 2017/0106899 | A1 * | 4/2017 | Xu | B60L 1/003 |
| 2018/0229609 | A1 * | 8/2018 | Hudson | B60L 58/20 |
| 2018/0229676 | A1 * | 8/2018 | Hudson | B60R 16/03 |
| 2019/0291601 | A1 * | 9/2019 | Vanerhav | B60L 58/21 |
| 2019/0312449 | A1 * | 10/2019 | Matsushita | H02J 1/102 |
| 2019/0366953 | A1 * | 12/2019 | Ganireddy | H02J 3/40 |
| 2020/0324659 | A1 * | 10/2020 | Lo Calzo | B60L 58/13 |
| 2020/0353823 | A1 * | 11/2020 | Eriksson | B60L 50/51 |
| 2020/0353843 | A1 * | 11/2020 | Eriksson | B60L 58/20 |
| 2021/0009007 | A1 * | 1/2021 | Day | B60L 58/20 |
| 2021/0107376 | A1 * | 4/2021 | Stolz | B60K 1/04 |
| 2021/0265918 | A1 * | 8/2021 | Vanerhav | H05K 7/2089 |
| 2021/0276425 | A1 * | 9/2021 | Gauthier | H02J 1/086 |
| 2021/0402939 | A1 * | 12/2021 | Obayashi | B60R 16/033 |
| 2022/0009429 | A1 * | 1/2022 | Awad Alla | H02M 1/32 |
| 2022/0032803 | A1 * | 2/2022 | Hao | B60L 50/66 |
| 2022/0115960 | A1 * | 4/2022 | Huang | H02M 3/285 |
| 2022/0126696 | A1 * | 4/2022 | Jeannard | B60L 58/10 |
| 2022/0231537 | A1 * | 7/2022 | Hirota | H02J 7/16 |
| 2022/0278529 | A1 * | 9/2022 | Gannamaneni | B60L 53/20 |
| 2022/0285950 | A1 * | 9/2022 | Ju | H02J 7/0048 |
| 2022/0344947 | A1 * | 10/2022 | Wu | H02M 3/1582 |
| 2023/0378770 | A1 * | 11/2023 | Ijaz | H02J 7/342 |
| 2023/0387795 | A1 * | 11/2023 | Örnberg et al. | H02J 1/082 |
| 2024/0025300 | A1 * | 1/2024 | Gannamaneni | H02J 7/0016 |
| 2024/0243667 | A1 * | 7/2024 | Ahmed | H02M 3/33573 |
| 2024/0383375 | A1 * | 11/2024 | Wright | B60L 58/10 |
| 2025/0050742 | A1 * | 2/2025 | Hong | B60L 58/21 |
| 2025/0105623 | A1 * | 3/2025 | Wang | H02J 3/381 |

FOREIGN PATENT DOCUMENTS

| | | |
|---|---|---|
| CN | 106696704 A | 5/2017 |
| CN | 206544473 U | 10/2017 |
| CN | 108340856 A | 7/2018 |
| CN | 108569232 A | 9/2018 |
| CN | 112104065 A | 12/2020 |
| EP | 2 998 150 B1 | 8/2019 |
| GB | 2574868 A | 12/2019 |
| WO | 2015/092441 A2 | 6/2015 |

OTHER PUBLICATIONS

European Patent Application No. 20216702.9 filed Dec. 22, 2020, 18 pages.
CN Patent Application 202111382665.X filed Nov. 22, 2021, 18 pages.
U.S. Appl. No. 17/540,431, filed Dec. 2, 2021, 16 pages.
Extended European Search Report received for European Patent Application Serial No. 22159436.9 dated Aug. 3, 2022, 7 pages.
Communication Pursuant to Rule 69 EPC received for European Patent Application Serial No. 22159436.9 dated Sep. 12, 2022, 2 pages.
First Office Action received for Chinese Patent Application Serial No. 202210193634.8 dated Nov. 12, 2024, 20 pages (Including English Translation).

* cited by examiner

BATTERY ARCHITECTURE WITHOUT LOW VOLTAGE BATTERY

CROSS-REFERENCE TO RELATED APPLICATION

This application claims priority to U.S. Provisional Patent Application No. 63/155,039, filed on Mar. 1, 2021, and entitled "ONE-BATTERY ARCHITECTURE WITHOUT LOW VOLTAGE BATTERY," the entirety of which application is hereby incorporated by reference herein.

TECHNICAL FIELD

The disclosed subject matter relates to electric vehicle battery systems, and more particularly, to battery architectures for electric vehicles that do not employ a low voltage battery.

BACKGROUND

Since nearly the introduction of the automobile, cars have comprised at least one battery as a power-source for low-voltage electrical needs. Low voltage (e.g., 12 volt) batteries in conventional vehicles are utilized to power a variety of vehicle components. Such batteries occupy significant space in a vehicle, require bulky electrical distribution components, and often require replacement many times during the lifecycle of a vehicle. Therefore, such low voltage batteries must be accessible for ease of replacement, further occupying valuable space in a vehicle. Some conventional vehicles utilize lithium ion low voltage batteries or capacitors, but such solutions still incur space and monetary costs with respect to corresponding vehicles.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. As described, there exists a need for a battery system that satisfied low voltage loads or power demands without comprising a low voltage battery, and various embodiments are described herein to this end and/or other ends.

According to an embodiment, an electric vehicle battery system can comprise a battery pack comprising a first battery group and a second battery group, wherein the first battery group comprises one or more battery cells and the second battery group comprises one or more battery cells; a first direct current to direct current (DC-DC) converter connected to the first battery group and to a first cluster; and a second DC-DC converter connected to the second battery group and to a second cluster.

According to another embodiment, an electric vehicle can comprise a battery pack comprising a first battery group and a second battery group, wherein the first battery group comprises one or more battery cells and the second battery group comprises one or more battery cells; a first direct current to direct current (DC-DC) converter connected to the first battery group and to a first cluster; and a second DC-DC converter connected to the second battery group and to a second cluster.

According to an additional embodiment, a method can comprise determining, by a system comprising a processor, a first voltage of a first cluster; determining, by the system, a second voltage of a second cluster; converting, by the system using a first direct current to direct current (DC-DC) converter, a third voltage of a first battery group of a battery pack to the first voltage, wherein the first battery group comprises one or more battery cells; and converting, by the system using a second DC-DC converter, a fourth voltage of a second battery group of the battery pack to the second voltage, wherein the second battery group comprises one or more battery cells.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Removing low voltage (e.g., 12 volt) batteries from vehicles has a variety of benefits, such as a reduction in parts that can eventually fail and require replacement, and reduced environmental impacts by utilizing less lead or lithium. Additionally, because failure of a 12 volt battery result in safety concerns for electrically coupled systems, removing the 12 volt battery, and implementing systems or architectures in connection with one or more embodiments herein, can result in improved safety and sustainability of corresponding vehicles (e.g., electric vehicles or hybrid vehicles).

Figure 1:
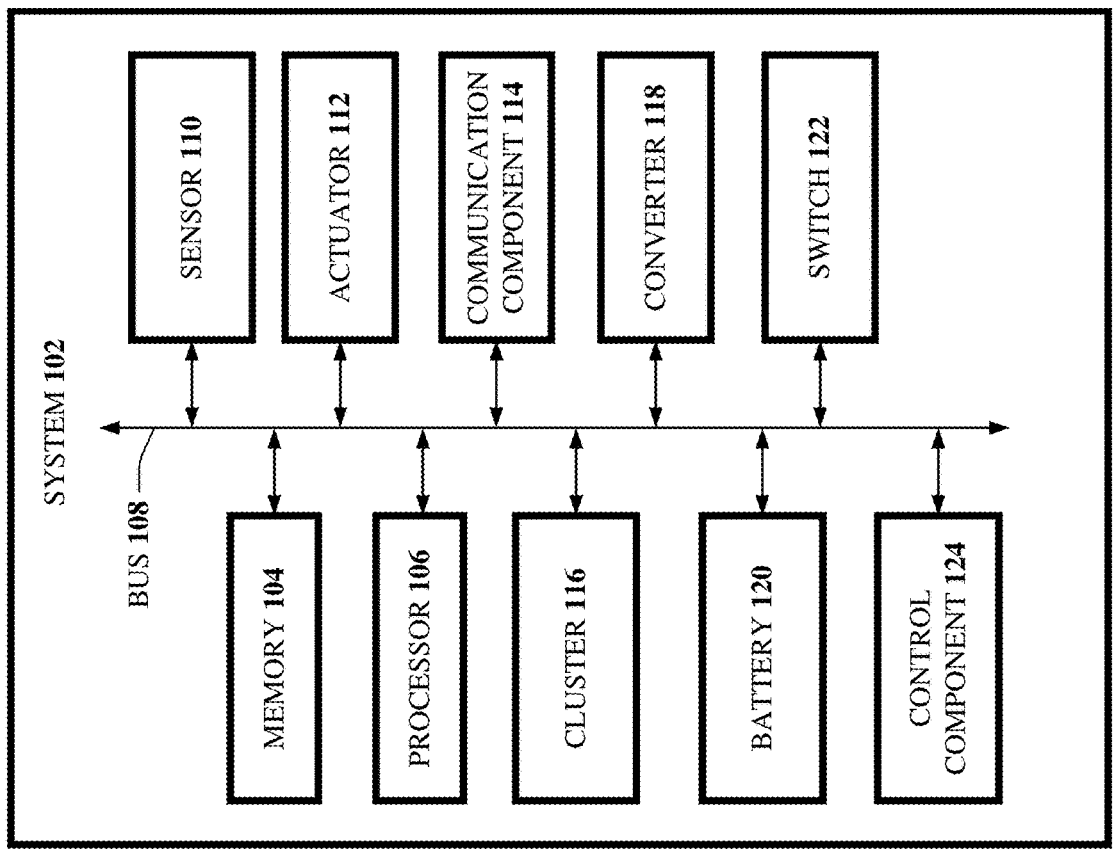
FIG. 1 illustrates a block diagram of an example, non-limiting system in accordance with one or more embodiments described herein.

Turning now to FIG. 1, there is illustrated an example, non-limiting system 102 in accordance with one or more embodiments herein. In various embodiments, system 102 can comprise a computerized tool, which can be configured to perform various operations relating to battery architectures or electrical load management. The system 102 can comprise or be connected to one or more of a variety of components, such as memory 104, processor 106, bus 108, sensor 110, actuator 112, communication component 114, cluster 116, converter 118, battery 120, switch 122, and/or control component 124.

In various embodiments, one or more of the memory 104, processor 106, bus 108, sensor 110, actuator 112, communication component 114, cluster 116, converter 118, battery 120, switch 122, and/or control component 124 can be communicatively or operably coupled (e.g., over a bus or wireless network) to one another to perform one or more functions of the system 102.

According to an embodiment, sensor 110 can comprise one or more of a variety of sensors (e.g., voltmeter, current sensor, position sensor, pressure sensor, force or bump sensor, vibration sensor, optical sensor, microphone, proximity sensor, or other sensors). Based on an output of one or more of the sensor 110, an actuator 112 (e.g., linear actuator, rotary actuator, solenoid, relay, servo, motor, or other type of actuator) can be enabled or disabled (e.g., by the control component 124). For example, the control component 124 can control an actuator 112 herein to electrically couple or decouple a cluster or load herein from the system 102 or battery 120. Further, the control component 124 can control an actuator 112 herein to electrically couple or decouple a battery group of a battery pack herein (e.g., a battery 120) from a high voltage load or high voltage distribution. According to an embodiment, the control component 124 can utilize predictive power management in order to distribute actuations over time and/or decrease loads prior to higher power activations.

In various embodiments, electrical power can be supplied by a battery 120. In one or more embodiments, the battery 120 can comprise a battery pack or a battery assembly, which can comprise one or more groups of battery cells (e.g., a first battery group, a second battery group, a third battery group, and so on). Each battery pack and/or battery group can comprise one or more battery cells. In this regard, the battery 120 can comprise one or more battery cells, and can comprise one or more battery groups. In various implementations, battery packs and/or groups herein can comprise 800 volts, 400 volts, 600 volts, 200 volts, or other suitable voltages for vehicles (e.g., electric vehicles, hybrid vehicles, or other types of vehicles) herein. In one or more embodiments, battery groups within a battery pack (e.g., battery 120) can be series connected and/or connected in parallel. In this regard, a first battery group and a second battery group can be connected in series and/or parallel.

According to an embodiment, the system 102 can comprise a converter 118. In various embodiments, the converter 118 can comprise a direct current to direct current (DC-DC) converter. It is noted that a plurality of the converter 118 can be utilized in the system 102. For example, the system 102 can comprise a battery 120 (e.g., a battery pack) comprising a first battery group (e.g., of battery cells) and second battery group (e.g., of battery cells). The system 102 can comprise one or more DC-DC converters (e.g., converter 118) for each battery group. In this regard, a first DC-DC converter can convert a first voltage of the first battery group to a second voltage. In various implementations the second voltage can be lower than the first voltage. In an embodiment, a second DC-DC converter can convert a third voltage of the second battery group to a fourth voltage. In this regard, the fourth voltage can be lower than the third voltage. In various embodiments, the second voltage and the fourth voltage can comprise 12 volts. In various implementations, the first battery group and the second battery group are connected in series and/or parallel.

According to an embodiment, one or more of the cluster 116 can be electrically connected to the battery 120 (e.g., via the converter 118 and/or switch 122). For example, a first battery group can be connected to a first DC-DC converter and a first cluster (e.g., via a switch 122). Additionally, a second battery group can be connected to a second DC-DC converter and a second cluster (e.g., via a switch 122). In various embodiments, the switch 122 can be a common switch for a plurality of clusters (e.g., a first cluster, second cluster, third cluster, etc.). In further embodiments, a plurality of the switch 122 can be utilized, with one or more switches respectively connected to one or more clusters herein. In this regard, one or more of the switch 122 can facilitate low voltage power distribution herein (and/or high voltage power distribution. Clusters herein (e.g., cluster 116) can comprise a variety of loads. Each load can comprise one or more components of a corresponding vehicle. For example, a load herein can comprise steering control, climate control, power windows, power locks, communications or entertainment equipment, safety features or components (e.g., blind spot monitoring, autonomous driving, collision avoidance, lane departure warnings or avoidance), lighting systems or components, or other loads of a vehicle herein.

In various embodiments, the control component 124 can send or receive signals via the communication component 114. In an embodiment, the control component 124 can receive a signal comprising a command to send power to a cluster (or a load of a cluster) herein. In further embodiments, the control component can communicate with external components or systems (e.g., via the communication component 114). It is noted that the communication component 114 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

According to an embodiment, the control component 124 can determine a first voltage of a first cluster (e.g., of the cluster 116) (e.g., using the sensor 110). Similarly, the control component 124 can determine a second voltage (e.g., of second of the cluster 116) (e.g., using the sensor 110). The control component 124 can further convert (e.g., via the converter 118) a third voltage (e.g., of a battery group of the battery 120) to the first voltage. Similarly, the control component can further convert (e.g., via the converter 118) a fourth voltage (e.g., of a battery group of the battery 120) to the second voltage.

Figure 2:
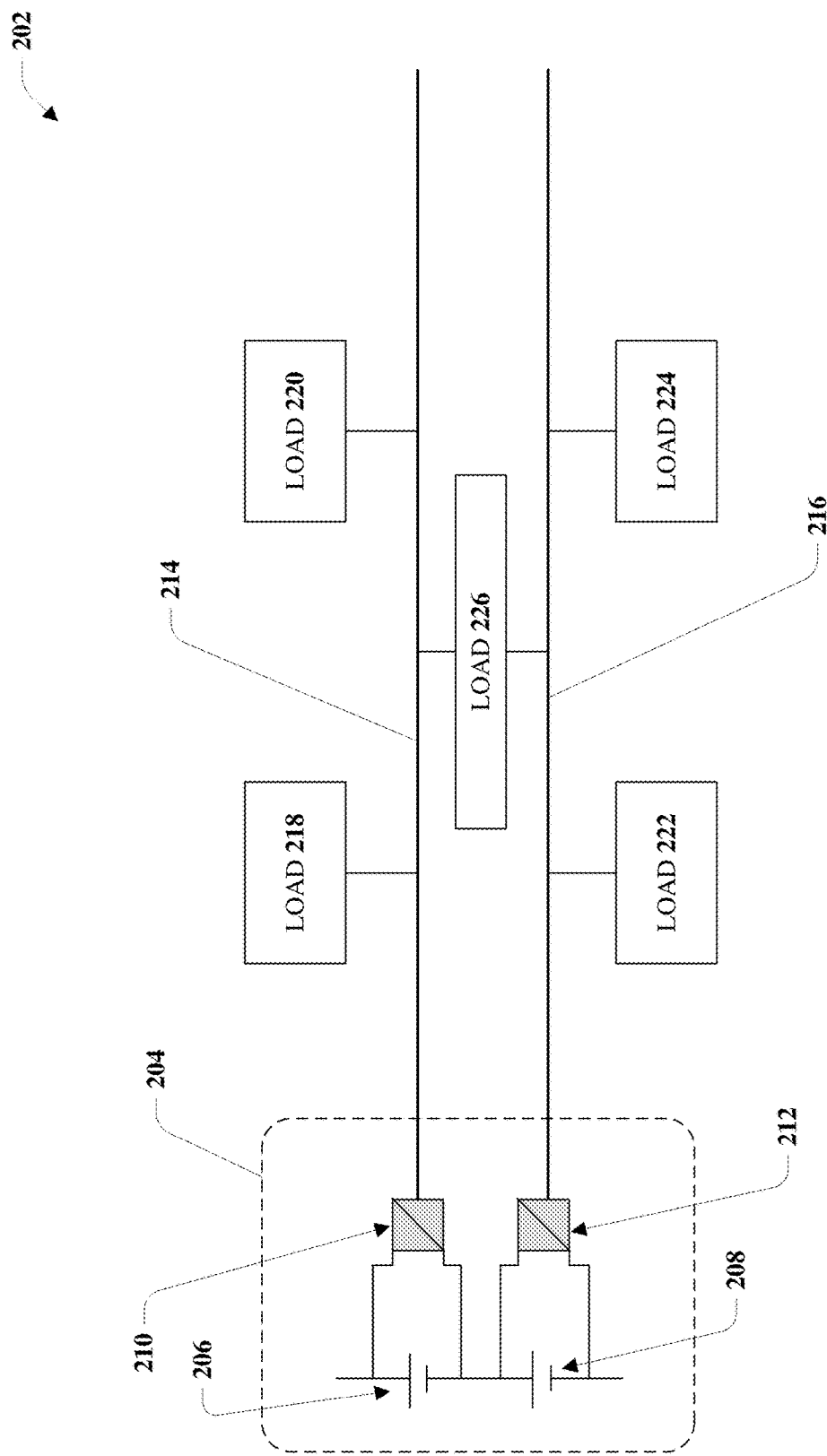
FIG. 2 illustrates a block diagram of an example, non-limiting battery architecture in accordance with one or more embodiments described herein.

FIG. 2 illustrates a block diagram of an example, non-limiting battery architecture 202 in accordance with one or more embodiments described herein. Battery architecture 202 can comprise one or more of a variety of components, such as power supply source 204, cluster 214, cluster 216, load 218, load 220, load 222, load 224, and/or load 226. In various embodiments, the power supply source 204 can comprise a battery group 206, battery group 208, DC-DC converter 210, and/or DC-DC converter 212.

In various embodiments, one or more of the power supply source 204, battery group 206, battery group 208, DC-DC converter 210, DC-DC converter 212, cluster 214, cluster 216, load 218, load 220, load 222, load 224, and/or load 226 can be communicatively or operably coupled (e.g., over a bus or wireless network) to one another to perform one or more functions of the battery architecture 202.

According to an embodiment, the battery architecture 202 can comprise separated power supply sources (e.g., two or more DC-DC converters and two or more batteries or battery groups) and/or separated distribution-systems to facilitate a fault-tolerant power-supply-structure without utilizing low voltage batteries. In this regard, components herein can be distributed in order to satisfy safety or availability requirements, with independence existing between the separated power supply sources or power supply source sections.

According to an embodiment, the power supply source 204 can comprise battery group 206, battery group 208, DC-DC converter 210, and/or DC-DC converter 212. In various embodiments, the battery group 206 and battery group 208 can be groups of a single battery pack. In this regard, a single battery back can comprise the battery group 206 and battery group 208. In further embodiments, the battery group 206 and battery group 208 can comprise separate battery packs. In various embodiments, battery group 206 and battery group 208 can be series connected, though parallel connections can be additionally or alternatively utilized. According to an embodiment, the DC-DC converter 210 can be connected to the battery group 206. Similarly, the DC-DC converter 212 can be connected to the battery group 208. In various embodiments, the DC-DC converter 210 can convert voltage (e.g., a first voltage) from the battery group 206 to a voltage of cluster 214 (e.g., a second voltage). For example, the voltage of the battery group 206 can comprise a high voltage, such as 800 volts, 600 volts, 400 volts, 200 volts, or another suitable high voltage (e.g., for propulsion of an electric vehicle). Similarly, the DC-DC converter 212 can convert voltage (e.g., a third voltage) from the battery group 208 to a voltage of cluster 216 (e.g., a fourth voltage). For example, the voltage of the battery group 208 can comprise a high voltage, such as 800 volts, 600 volts, 400 volts, 200 volts, or another suitable high voltage (e.g., for propulsion of an electric vehicle). Voltage of cluster 214 and/or cluster 216 can comprise a low voltage (e.g., 12 volts, 14 volts, 24 volts, 48 volts, or another suitable low voltage). Utilizing such clusters can enable redundancy for safety systems or other critical systems of a corresponding vehicle. In this regard, if one of the clusters were to fail, power can still be provided to critical systems, such as steering systems, collision avoidance systems, communication systems, power door/lock systems, or other vehicular systems.

According to an embodiment, load 218 can be connected to the cluster 214. Load 218 can comprise one or more of a variety of loads. Such loads herein (e.g., load 218, load 220, load 222, load 224, load 226, or other loads herein) can conform to one or more Automotive Safety Integrity Level (ASIL) classifications. For instance, one or more loads (e.g., load 218, load 220, load 222, load 224, load 226, or other loads herein) and/or embodiments herein can conform to ASIL A, B, C, D, or QM. In this regard, it can be appreciated that critical systems (e.g., of a respective vehicle herein) can be supplied power from more than one cluster (e.g., cluster 214 and cluster 216). Distribution of loads among cluster 214 and/or cluster 216 can be separated, such that a failure of one component (e.g., a battery or battery group, a DC-DC converter, a wire, or another failed component) or cluster does not impact another component or cluster. According to an example, load 218 (e.g., a first load) and load 222 (e.g., a second load) can comprise redundant systems. In this regard, if either load 218 or load 222 were to experience a failure (e.g., or a respective cluster 214 or 216 were to experience a failure), functionality from the load 218 or load 222 can be maintained due to, for example, the redundancy of the load 218 and load 222. Similarly, load 220 and load 224 can comprise redundant loads. According to an embodiment, load 226 can be connected to more than one cluster. In this regard, load 226 (e.g., a third load) can be connected to cluster 214 and cluster 216. In this regard, failure of a cluster (e.g., cluster 214 or cluster 216) would not result in load 226 losing power. In various embodiments, cluster 214 or cluster 216 can satisfy one or more ASIL standards.

Figure 3:
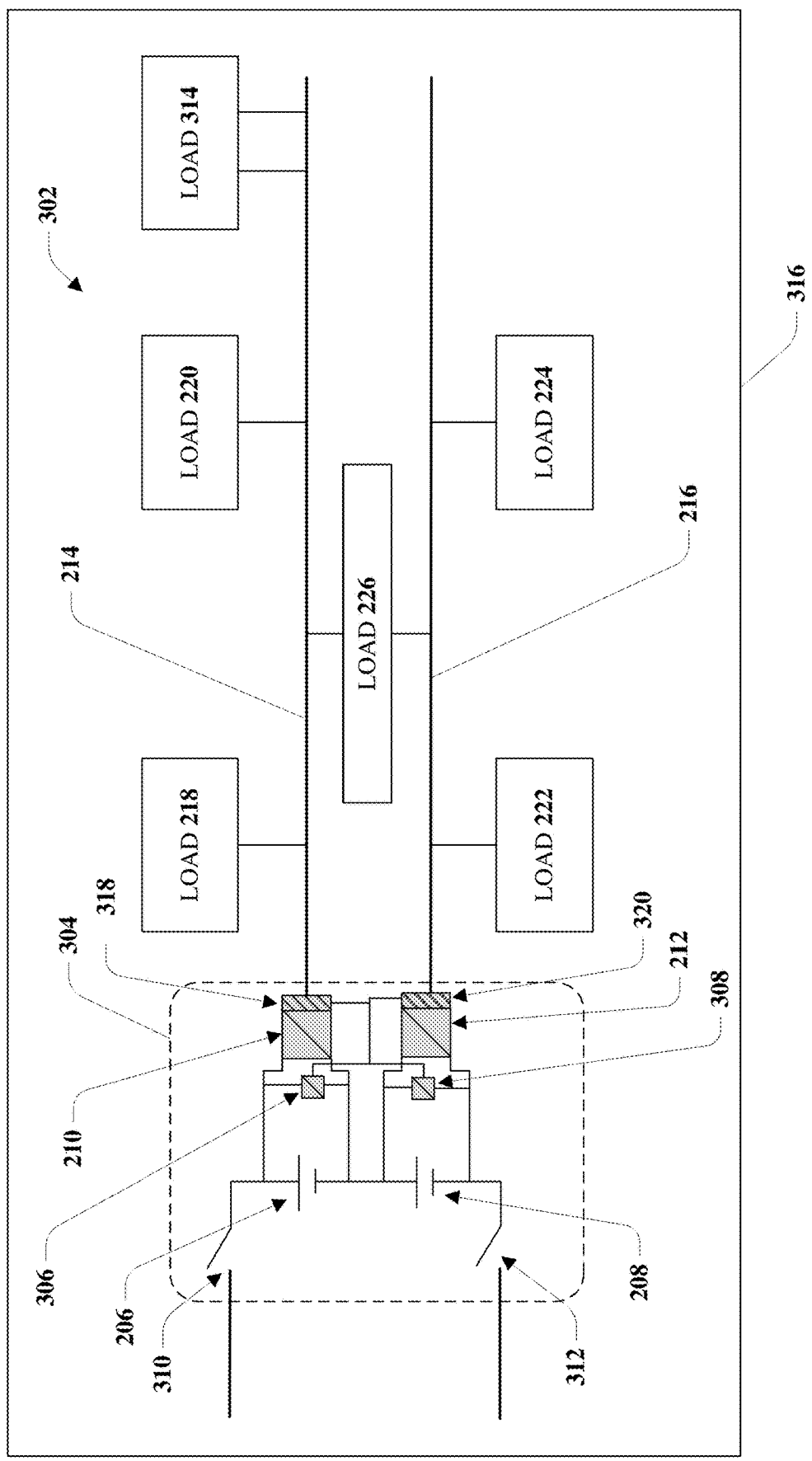
FIG. 3 illustrates a block diagram of an example, non-limiting vehicle in accordance with one or more embodiments described herein.

FIG. 3 illustrates a block diagram of an example, non-limiting vehicle 316 in accordance with one or more embodiments described herein. In one or more embodiments, the vehicle 316 can comprise a battery architecture 302. In various embodiments, battery architecture 302 can be similar to battery architecture 202. Repetitive description of like elements and/or processes employed in respective embodiments is omitted for sake of brevity. Battery architecture 302 can comprise one or more of a variety of components, such as power supply source 304, cluster 214, cluster 216, load 218, load 220, load 222, load 224, load 226, and/or load 314. In various embodiments, the power supply source 304 can comprise a battery group 206, battery group 208, DC-DC converter 210, DC-DC converter 212, DC-DC converter 306, DC-DC converter 308, switch 310, switch 312, switch 318 and/or switch 320.

In one or more embodiments, one or more of the power supply source 304, cluster 214, cluster 216, load 218, load 220, load 222, load 224, load 226, load 314, battery group 206, battery group 208, DC-DC converter 210, DC-DC converter 212, DC-DC converter 306, DC-DC converter 308, switch 310, switch 312, switch 318, and/or switch 320 can be communicatively or operably coupled (e.g., over a bus or wireless network) to one another to perform one or more functions of the battery architecture 302 or vehicle 316.

According to an embodiment, the power supply source 304 can comprise battery group 206, battery group 208, DC-DC converter 210, DC-DC converter 212, DC-DC converter 306, DC-DC converter 308, switch 310, switch 312, switch 318, and/or switch 320. According to an implementation, the DC-DC converter 306 can be connected to the battery group 206. Similarly, the DC-DC converter 308 can be connected to the battery group 208. In various embodiments, the DC-DC converter 306 can convert voltage from the battery group 206 to a voltage of cluster 214. For example, the voltage of the battery group 206 can comprise a high voltage, such as 800 volts, 600 volts, 400 volts, 200 volts, or another suitable high voltage (e.g., for propulsion of the vehicle 316, such as an electric vehicle or a hybrid vehicle). Similarly, the DC-DC converter 308 can convert voltage from the battery group 208 to a voltage of cluster 216. In various embodiments, the DC-DC converter 306 and DC-DC converter 210 can both be connected to the battery group 206 and cluster 214 (e.g., via one or more of switch 318). According to an embodiment, the DC-DC converter 306 can be utilized when the vehicle 316 is parked, and the DC-DC converter 210 can be utilized when the vehicle 316 is driving (e.g., and requires more or larger loads). Thus, in an implementation, the DC-DC converter 210 can output more current than the DC-DC converter 306. Similarly, in various embodiments, the DC-DC converter 308 and DC-DC converter 212 can both be connected to the battery group 208 and cluster 216 (e.g., via one or more of switch 320). According to an embodiment, the DC-DC converter 308 can be utilized when the vehicle 316 is parked, and the DC-DC converter 212 can be utilized when the vehicle 316 is driving (e.g., and requires more or larger loads). Thus, in an implementation, the DC-DC converter 212 can output more current than the DC-DC converter 308. In various embodiments, switch 318 can be directly connected to the DC-DC converter 210, DC-DC converter 306, and/or one or more loads on cluster 214. Similarly, switch 320 can be directly connected to the DC-DC converter 212, DC-DC converter 308, and/or one or more loads on cluster 216. In this regard, by directly connecting the switch 318 or switch 320 to respective DC-DC converters and/or respective loads, a short control loop can be utilized to transmit power more quickly (e.g., within three milliseconds). Thus, respective DC-DC converter capacity (e.g., voltage and/or current) can be utilized with respect to priority of loads (e.g., critical loads, non-critical loads, or other suitable loads), for example, when disconnecting non-critical loads or isolating faults (e.g., without impacting power supply to other loads). It is noted that, though switch 318 and switch 320 are depicted a singular switches, switch 318 and/or switch 320 can each represent a plurality of switches connected to one or more loads or clusters herein.

According to an embodiment, the load 314 can be connected to the cluster 214. In various embodiments, load 314 can comprise a dual feed load. In this regard, load 314 can comprise two or more power feed cables from the cluster 214. The foregoing can be utilized, for example, with loads that require too much power for a single power feed cable (e.g., too much resistance would result over a single power feed cable). Therefore, multiple power feeds cables can be utilized rather than a single, larger, or upsized power feed cable. It is noted that load 314 can additionally conform to one or more ASIL classifications. For instance, load 314 can conform to ASIL A, B, C, D, or QM.

It is noted that, by utilizing a plurality of battery groups or modules, interference on one cluster (e.g., cluster 214) does not impact interference on another cluster (e.g., cluster 216). In one or more embodiments, the DC-DC converter 210 can comprise or be coupled to a power distribution module. Such a power distribution module can comprise one or more switches that can output current to one or more loads herein. In one or more embodiments, cluster 214 and cluster 216 can comprise the same voltage (e.g., 12 volts, 14 volts, 24 volts, 48 volts, or other suitable voltages). In further embodiments, cluster 214 and cluster 216 can comprise different voltages. In some embodiments, a small variance in voltage can exist between the cluster 214 and the cluster 216.

According to an embodiment, switch 310 and/or switch 312 can be utilized to couple or decouple the battery group 206 and/or battery group 208 from high voltage loads (e.g., for propulsion of the vehicle 316) or from high voltage power distribution components. In various embodiments, load 218, load 220, load 222, load 224, load 226, or load 314 can comprise key-off energy (e.g., for daily or long-term parking), post-crash energy reserve, starter power reserve, safety critical power reserve (e.g., ASIL-B or ASIL-C), fuse opening capacity at fault, jumpstart/external wake-up, pre-charge inrush supply at activation (e.g., filter for 12 volt ripple), an energy storage to absorb generated power from electrical motors (e.g., to ensure voltage below 16 volts or another defined voltage), power supply when DC-DC converters herein are disabled, turned off, or inoperable (e.g., in a small battery or capacitor), energy reserve when a high voltage battery is completely drained or comprises an open circuit (e.g., in a small battery or capacitor), a power source in window between a DC-DC converter 210 and DC-DC converter 306 or DC-DC converter 212 and DC-DC converter 308, automated driving safety critical ASIL D power reserve (e.g., 200 volts per minute), low voltage charge balance, or another suitable load.

Figure 4:
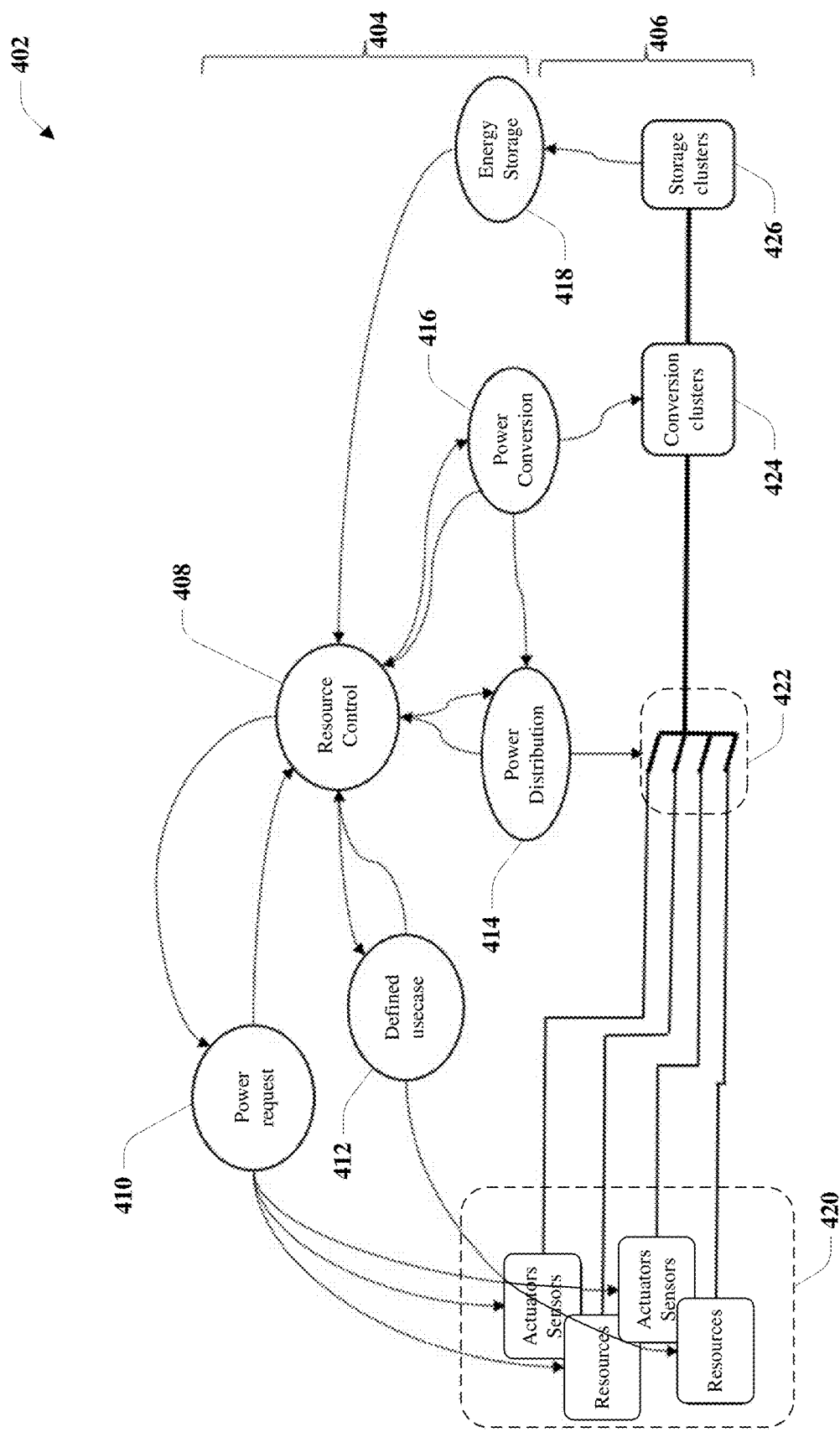
FIG. 4 illustrates a block diagram of a galvanic view and logic view of power management and distribution in accordance with one or more embodiments described herein.

FIG. 4 illustrates a block diagram 402 of a galvanic view 406 and logic view 404 of power management and distribution in accordance with one or more embodiments described herein. According to an embodiment, galvanic view 406 can comprise one or more components described in various embodiments herein, and logic view 404 can comprise logic or determinations, calculations, steps, or other logical functions of a system, battery architecture, or vehicle herein (e.g., system 102, battery architecture 202, or vehicle 316) (e.g., via a processor 106 and/or memory 104). In various embodiments, galvanic view 406 depicts peripherals 420, distribution clusters 422, conversion clusters 424, and storage clusters 426. In one or more embodiments, logic view 404 depicts energy storage 418, power conversion 416, power distribution 414, resource control 408, power request 410, and defined usecase 412. In various embodiments, peripherals 420 can comprise one or more actuators (e.g., actuator 112), one or more sensors (e.g., sensor 110), one or more resources, one or more loads, or other suitable peripherals. Distribution clusters 422 can comprise one or more switches (e.g., switch 122, switch 318, or switch 320), and/or one or more clusters (e.g., cluster 116, cluster 214, or cluster 216). Conversion clusters 424 can comprise one or more DC-DC converters (e.g., converter 118, DC-DC converter 210, DC-DC converter 306, DC-DC converter 212, DC-DC converter 308). Storage clusters 426 can comprise one or more batteries (e.g., battery 120, battery group 206, or battery group 208). According to an embodiment, resource control 408, power request 410, defined usecase 412, power distribution 414, power conversion 416, and/or energy storage 418 can be facilitated by processor 106 and/or memory 104. In various embodiments, resource control 408 can comprise power capacity and/or availably control. According to an embodiment, a status (e.g., storage capacity, wear status, or another suitable status) of the storage clusters 426 can be determined at energy storage 418. In this regard, such a status can comprise a capacity determination of one or more components of the storage clusters 426 (e.g., batteries, battery groups, capacitors, or other suitable storage components). The determined capacity can be utilized in resource control 408. Power conversion 416 can facilitate transmission of information (e.g., capacity information, requests, instructions, or other suitable information) between the conversion clusters 424 and resource control 408. Further, power conversion 416 can send responsive activation or deactivation instructions, for example, to power distribution 414. Power distribution 414 can provide power distribution requests, for example, to the distribution clusters 422. It is noted that the distribution clusters 422 can comprise one or more of a variety of respective severities and/or priorities. Additionally, power distribution 414 can receive requests from resource control 408 and/or provide a status (e.g., of resource or storage capacity) to resource control 408. Defined usecase 412 can comprise one or more instructions to provide to the peripherals 420. In this regard, resource control 408 can enable availability (e.g., power availability) for one or more of the peripherals 420, and send a corresponding request to one or more of the peripherals 420. Similarly, power request 410 can comprise one or more instructions to provide to the peripherals 420. In this regard, resource control 408 can enable availability (e.g., power availability) for one or more of the peripherals 420, and send a corresponding request to one or more of the peripherals 420.

Figure 5:
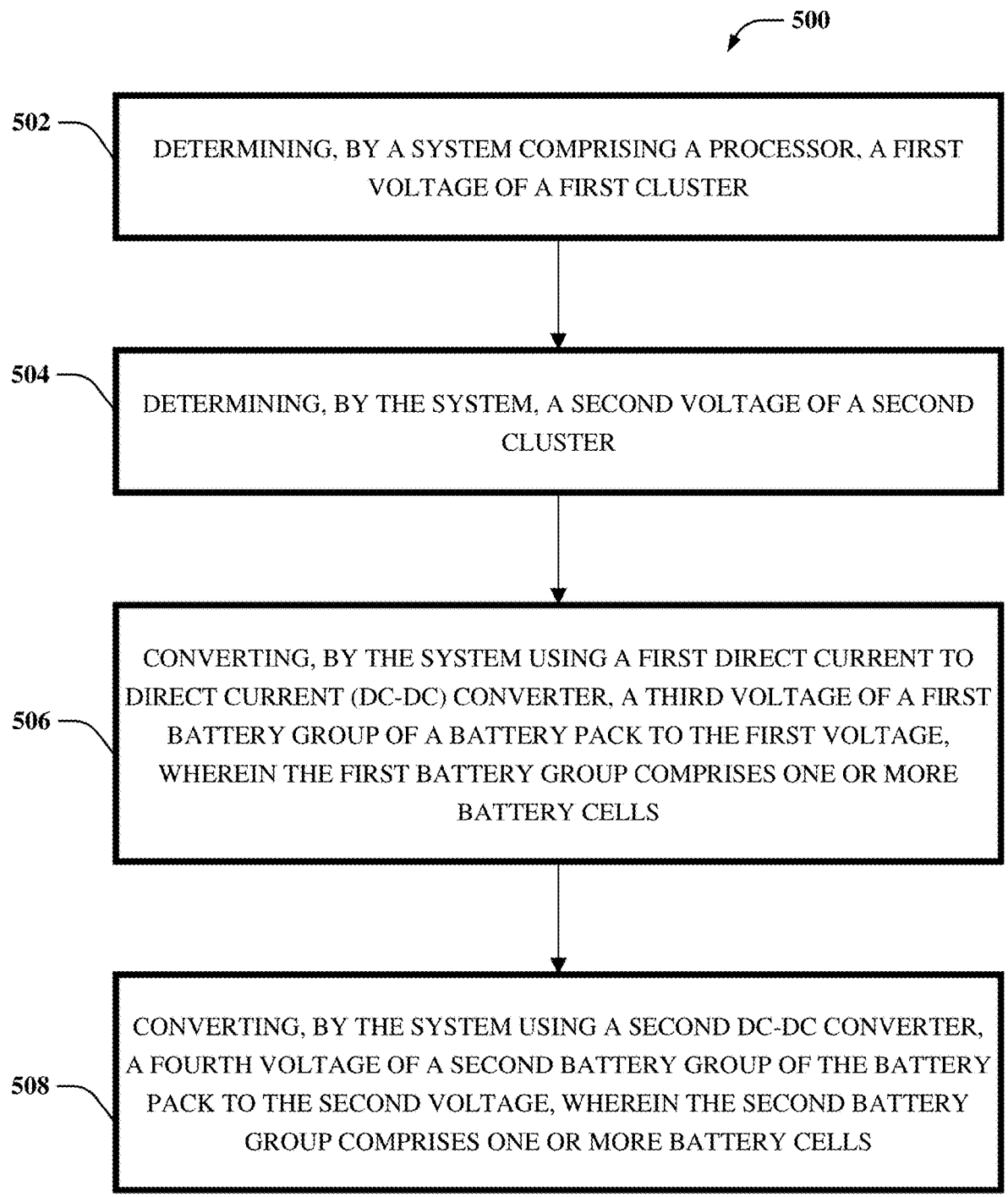
FIG. 5 illustrates a flow diagram of an example, non-limiting process in accordance with one or more embodiments described herein.

FIG. 5 illustrates a block flow diagram of an example, non-limiting process 500 in accordance with one or more embodiments described herein. According to an embodiment, process 500 can be associated with one or more systems, battery architectures, or vehicles described herein. Repetitive description of like elements and/or processes employed in respective embodiments is omitted for sake of brevity. At 502, the process 500 can comprise determining, by a system comprising a processor (e.g., using control component 124), determining, by a system comprising a processor, a first voltage of a first cluster (e.g., cluster 214). At 504, the process 500 can comprise determining, by the system, a second voltage of a second cluster (e.g., cluster 216). At 506, the process 500 can comprise converting, by the system using a first direct current to direct current (DC-DC) converter (e.g., DC-DC converter 210), a third voltage of a first battery group (e.g., battery group 206) of a battery pack to the first voltage, wherein the first battery group comprises one or more battery cells. At 508, the process 500 can comprise converting, by the system using a second DC-DC converter (e.g., DC-DC converter 212), a fourth voltage of a second battery group (e.g., battery group 208) of the battery pack to the second voltage, wherein the second battery group comprises one or more battery cells.

The above-described systems and/or architectures can comprise a memory which can store one or more computer/machine readable and/or executable components and/or instructions that, when executed by a processor (e.g., a classical processor, a quantum processor, etc.), can facilitate performance of operations defined by the executable component(s) and/or instruction(s). The memory can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures.

The above-described systems or architectures can comprise a processor which can comprise one or more types of processors and/or electronic circuitry (e.g., a classical processor, graphics processor, a quantum processor, etc.) that can implement one or more computer and/or machine readable, writable, and/or executable components and/or instructions that can be stored on a memory. For example, the processor can perform various operations that can be specified by such computer and/or machine readable, writable, and/or executable components and/or instructions including, but not limited to, logic, control, input/output (I/O), arithmetic, and/or the like. In some embodiments, processors herein can comprise one or more central processing unit, multi-core processor, microprocessor, dual microprocessors, microcontroller, System on a Chip (SOC), array processor, vector processor, quantum processor, and/or another type of processor.

Systems or architectures described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, systems herein (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems or architectures herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, a system herein can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, systems herein can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

Systems or architectures herein can comprise one or more computer and/or machine readable, writable, and/or executable components and/or instructions that, when executed by processor (e.g., a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). For example, any component associated with systems as disclosed herein (e.g., communicatively, electronically, operatively, and/or optically coupled with and/or employed by a system described herein), can comprise such computer and/or machine readable, writable, and/or executable component(s) and/or instruction(s). Consequently, according to numerous embodiments or systems herein and/or any components associated therewith as disclosed herein, can employ a processor to execute such computer and/or machine readable, writable, and/or executable component(s) and/or instruction(s) to facilitate performance of one or more operations described herein with reference to system herein and/or any such components associated therewith.

Systems or architectures herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system herein can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 6:
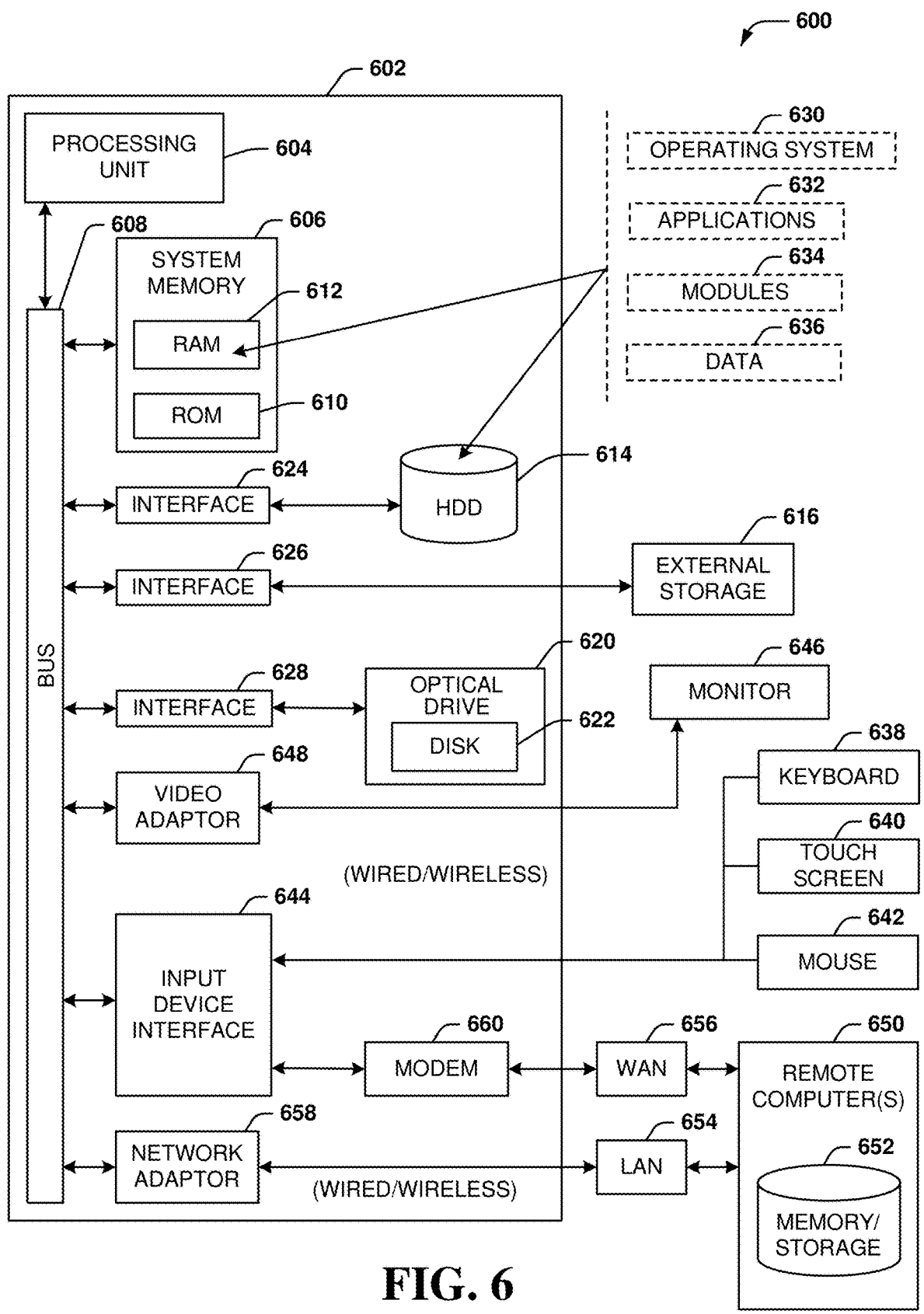
FIG. 6 is an example, non-limiting computing environment in which one or more embodiments described herein can be implemented.

In order to provide additional context for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 6, the example environment 600 for implementing various embodiments of the aspects described herein includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also include a high-speed RAM such as static RAM for caching data.

The computer 602 further includes an internal hard disk drive (HDD) 614 (e.g., EIDE, SATA), one or more external storage devices 616 (e.g., a magnetic floppy disk drive (FDD) 616, a memory stick or flash drive reader, a memory card reader, etc.) and an optical disk drive 620 (e.g., which can read or write from a CD-ROM disc, a DVD, a BD, etc.). While the internal HDD 614 is illustrated as located within the computer 602, the internal HDD 614 can also be configured for external use in a suitable chassis (not shown). Additionally, while not shown in environment 600, a solid-state drive (SSD) could be used in addition to, or in place of, an HDD 614. The HDD 614, external storage device(s) 616 and optical disk drive 620 can be connected to the system bus 608 by an HDD interface 624, an external storage interface 626 and an optical drive interface 628, respectively. The interface 624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 612, including an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

Computer 602 can optionally comprise emulation technologies. For example, a hypervisor (not shown) or other intermediary can emulate a hardware environment for operating system 630, and the emulated hardware can optionally be different from the hardware illustrated in FIG. 6. In such an embodiment, operating system 630 can comprise one virtual machine (VM) of multiple VMs hosted at computer 602. Furthermore, operating system 630 can provide runtime environments, such as the Java runtime environment or the .NET framework, for applications 632. Runtime environments are consistent execution environments that allow applications 632 to run on any operating system that includes the runtime environment. Similarly, operating system 630 can support containers, and applications 632 can be in the form of containers, which are lightweight, standalone, executable packages of software that include, e.g., code, runtime, system tools, system libraries and settings for an application.

Further, computer 602 can be enable with a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 602 through one or more wired/wireless input devices, e.g., a keyboard 638, a touch screen 640, and a pointing device, such as a mouse 642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 604 through an input device interface 644 that can be coupled to the system bus 608, but can be connected by other interfaces, such as a parallel port, an IEEE 1394 serial port, a game port, a USB port, an IR interface, a BLUETOOTH® interface, etc.

A monitor 646 or other type of display device can be also connected to the system bus 608 via an interface, such as a video adapter 648. In addition to the monitor 646, a computer typically includes other peripheral output devices (not shown), such as speakers, printers, etc.

The computer 602 can operate in a networked environment using logical connections via wired and/or wireless communications to one or more remote computers, such as a remote computer(s) 650. The remote computer(s) 650 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 652 is illustrated. The logical connections depicted include wired/wireless connectivity to a local area network (LAN) 654 and/or larger networks, e.g., a wide area network (WAN) 656. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 654 through a wired and/or wireless communication network interface or adapter 658. The adapter 658 can facilitate wired or wireless communication to the LAN 654, which can also include a wireless access point (AP) disposed thereon for communicating with the adapter 658 in a wireless mode.

When used in a WAN networking environment, the computer 602 can include a modem 660 or can be connected to a communications server on the WAN 656 via other means for establishing communications over the WAN 656, such as by way of the Internet. The modem 660, which can be internal or external and a wired or wireless device, can be connected to the system bus 608 via the input device interface 644. In a networked environment, program modules depicted relative to the computer 602 or portions thereof, can be stored in the remote memory/storage device 652. It will be appreciated that the network connections shown are example and other means of establishing a communications link between the computers can be used.

When used in either a LAN or WAN networking environment, the computer 602 can access cloud storage systems or other network-based storage systems in addition to, or in place of, external storage devices 616 as described above. Generally, a connection between the computer 602 and a cloud storage system can be established over a LAN 654 or WAN 656 e.g., by the adapter 658 or modem 660, respectively. Upon connecting the computer 602 to an associated cloud storage system, the external storage interface 626 can, with the aid of the adapter 658 and/or modem 660, manage storage provided by the cloud storage system as it would other types of external storage. For instance, the external storage interface 626 can be configured to provide access to cloud storage sources as if those sources were physically connected to the computer 602.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 7:
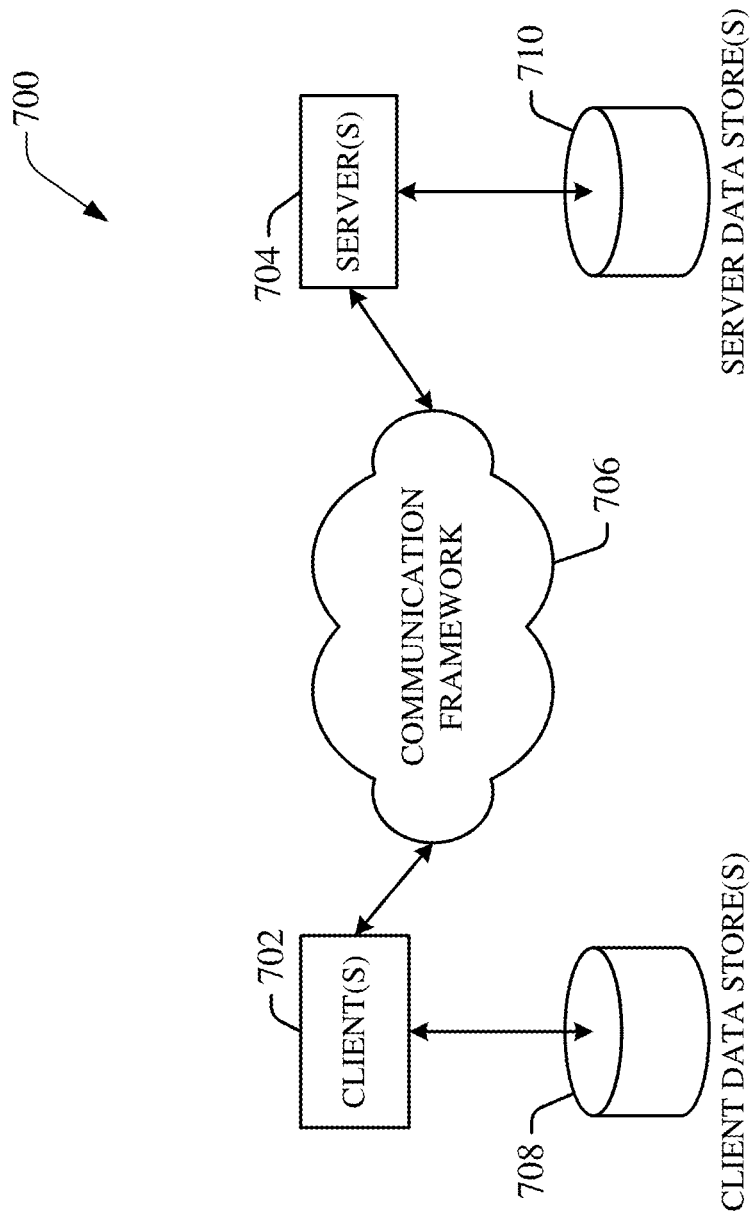
FIG. 7 is an example, non-limiting networking environment in which one or more embodiments described herein can be implemented.

Referring now to FIG. 7, there is illustrated a schematic block diagram of a computing environment 700 in accordance with this specification. The system 700 includes one or more client(s) 702, (e.g., computers, smart phones, tablets, cameras, PDA's). The client(s) 702 can be hardware and/or software (e.g., threads, processes, computing devices). The client(s) 702 can house cookie(s) and/or associated contextual information by employing the specification, for example.

The system 700 also includes one or more server(s) 704. The server(s) 704 can also be hardware or hardware in combination with software (e.g., threads, processes, computing devices). The servers 704 can house threads to perform transformations of media items by employing aspects of this disclosure, for example. One possible communication between a client 702 and a server 704 can be in the form of a data packet adapted to be transmitted between two or more computer processes wherein data packets can include coded analyzed headspaces and/or input. The data packet can include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

In one exemplary implementation, a client 702 can transfer an encoded file, (e.g., encoded media item), to server 704. Server 704 can store the file, decode the file, or transmit the file to another client 702. It is to be appreciated, that a client 702 can also transfer uncompressed file to a server 704 and server 704 can compress the file and/or transform the file in accordance with this disclosure. Likewise, server 704 can encode information and transmit the information via communication framework 706 to one or more clients 702.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. An electric vehicle battery system, comprising:
   a battery pack comprising a first battery group and a second battery group, wherein the first battery group comprises one or more battery cells and the second battery group comprises one or more battery cells;
   a first direct current to direct current (DC-DC) converter connected to the first battery group and to a first cluster; and
   a second DC-DC converter connected to the second battery group and to a second cluster.
2. The electric vehicle battery system of any preceding clause, wherein the first DC-DC converter converts a first voltage of the first battery group to a second voltage.
3. The electric vehicle battery system of any preceding clause, wherein the second voltage is lower than the first voltage.
4. The electric vehicle battery system of any preceding clause, wherein the second DC-DC converter converts a third voltage of the second battery group to a fourth voltage.
5. The electric vehicle battery system of any preceding clause, wherein the fourth voltage is lower than the third voltage.
6. The electric vehicle battery system of any preceding clause, wherein the second voltage and the fourth voltage comprise 12 volts.
7. The electric vehicle battery system of any preceding clause, wherein the first battery group comprises 800 volts and the second battery group comprises 800 volts.
8. The electric vehicle battery system of any preceding clause, wherein the first battery group comprises 400 volts and the second battery group comprises 400 volts.
9. The electric vehicle battery system of any preceding clause, wherein the first battery group and the second battery group are connected in series.
10. The electric vehicle battery system of any preceding clause, wherein the first battery group and the second battery group are connected in parallel.
11. The electric vehicle battery system of clause 1 above with any set of combinations of electric vehicle battery systems 2-10 above.
12. An electric vehicle, comprising:
    a battery pack comprising a first battery group and a second battery group, wherein the first battery group comprises one or more battery cells and the second battery group comprises one or more battery cells;
    a first direct current to direct current (DC-DC) converter connected to the first battery group and to a first cluster; and
    a second DC-DC converter connected to the second battery group and to a second cluster.
13. The electric vehicle of any preceding clause, wherein a first voltage is associated with a first cluster, and wherein a second voltage, different from the first voltage, is associated with a second cluster.
14. The electric vehicle of any preceding clause, wherein the first cluster and the second cluster satisfy an automotive safety standard.
15. The electric vehicle of any preceding clause, wherein the first cluster is connected to first loads and the second cluster is connected to second loads, different from the first loads.
16. The electric vehicle of any preceding clause, further comprising third loads, wherein the third loads are connected to the first cluster and the second cluster.
17. The electric vehicle of any preceding clause, wherein one or more loads of the first loads and one or more loads of the second loads comprise redundant loads.
18. The electric vehicle of any preceding clause, further comprising:
    a third DC-DC converter connected to the first battery group; and
    a fourth DC-DC converter connected to the second battery group.
19. The electric vehicle of clause 12 above with any set of combinations of electric vehicles 13-18 above.
20. A method, comprising:
    determining, by a system comprising a processor, a first voltage of a first cluster;
    determining, by the system, a second voltage of a second cluster;
    converting, by the system using a first direct current to direct current (DC-DC) converter, a third voltage of a first battery group of a battery pack to the first voltage, wherein the first battery group comprises one or more battery cells; and
    converting, by the system using a second DC-DC converter, a fourth voltage of a second battery group of the battery pack to the second voltage, wherein the second battery group comprises one or more battery cells.
21. The method of any preceding clause, wherein the first voltage comprises 12 volts.
22. The method of any preceding clause, wherein the first voltage comprises 48 volts.
23. The method of clause 20 above with any set of combinations of methods 21-22 above.

What is claimed is:

1. An electric vehicle battery system, comprising:
   a battery pack comprising a first battery group and a second battery group, wherein the first battery group comprises one or more battery cells and the second battery group comprises one or more battery cells, and wherein the first battery group and the second battery group are connected in series;
   a first direct current to direct current (DC-DC) converter connected to the first battery group and to a first cluster, wherein the first DC-DC converter is configured to be utilized when a vehicle comprising the electric vehicle battery system is driving;
   a second DC-DC converter connected to the second battery group and to a second cluster, wherein the second DC-DC converter is configured to be utilized when the vehicle is driving;
   a third DC-DC converter connected to the first battery group, wherein the third DC-DC converter is configured to be utilized when the vehicle is parked;
   a fourth DC-DC converter connected to the second battery group, wherein the fourth DC-DC converter is configured to be utilized when the vehicle is parked;

a first switch connected to a positive terminal of the first battery group, wherein the first switch is configured to couple or decouple the first battery group from a propulsion load; and a second switch connected to a negative terminal of the second battery group, wherein the second switch is configured to couple or decouple the second battery group from the propulsion load.

2. The electric vehicle battery system of claim 1, wherein the first DC-DC converter converts a first voltage of the first battery group to a second voltage.

3. The electric vehicle battery system of claim 2, wherein the second voltage is lower than the first voltage.

4. The electric vehicle battery system of claim 2, wherein the second DC-DC converter converts a third voltage of the second battery group to a fourth voltage.

5. The electric vehicle battery system of claim 4, wherein the fourth voltage is lower than the third voltage.

6. The electric vehicle battery system of claim 4, wherein the second voltage and the fourth voltage comprise 12 volts.

7. The electric vehicle battery system of claim 4, wherein the first battery group comprises 800 volts and the second battery group comprises 800 volts.

8. The electric vehicle battery system of claim 4, wherein the first battery group comprises 400 volts and the second battery group comprises 400 volts.

9. An electric vehicle, comprising:
a battery pack comprising a first battery group and a second battery group, wherein the first battery group comprises one or more battery cells and the second battery group comprises one or more battery cells, and wherein the first battery group and the second battery group are connected in series;
a first direct current to direct current (DC-DC) converter connected to the first battery group and to a first cluster, wherein the first DC-DC converter is configured to be utilized when the electric vehicle is driving;
a second DC-DC converter connected to the second battery group and to a second cluster, wherein the second DC-DC converter is configured to be utilized when the electric vehicle is driving;
a third DC-DC converter connected to the first battery group, wherein the third DC-DC converter is configured to be utilized when the electric vehicle is parked;
a fourth DC-DC converter connected to the second battery group, wherein the fourth DC-DC converter is configured to be utilized when the electric vehicle is parked;
a first switch connected to a positive terminal of the first battery group, wherein the first switch is configured to couple or decouple the first battery group from a propulsion load; and
a second switch connected to a negative terminal of the second battery group, wherein the second switch is configured to couple or decouple the second battery group from the propulsion load.

10. The electric vehicle of claim 9, wherein a first voltage is associated with a first cluster, and wherein a second voltage, different from the first voltage, is associated with a second cluster.

11. The electric vehicle of claim 10, wherein the first cluster and the second cluster satisfy an automotive safety standard.

12. The electric vehicle of claim 10, wherein the first cluster is connected to first loads and the second cluster is connected to second loads, different from the first loads.

13. The electric vehicle of claim 12, further comprising third loads, wherein the third loads are connected to the first cluster and the second cluster.

14. The electric vehicle of claim 12, wherein one or more loads of the first loads and one or more loads of the second loads comprise redundant loads.

15. The electric vehicle of claim 12, wherein a load of the first loads comprises a dual feed load.

16. The electric vehicle of claim 9, wherein the first battery group comprises 200 volts and the second battery group comprises 200 volts.

17. The electric vehicle of claim 9, wherein the first battery group comprises 400volts and the second battery group comprises 400 volts.

18. A method, comprising:
determining, by a system comprising a processor, a first voltage of a first cluster;
determining, by the system, a second voltage of a second cluster;
converting, by the system using a first direct current to direct current (DC-DC) converter, while a vehicle comprising the system is driving, a third voltage of a first battery group of a battery pack to the first voltage, wherein the first battery group comprises one or more battery cells;
converting, by the system using a second DC-DC converter, while the vehicle is driving, a fourth voltage of a second battery group of the battery pack to the second voltage, wherein the second battery group comprises one or more battery cells, and wherein the first battery group and the second battery group are connected in series,
converting, by the system using a third DC-DC converter, while the vehicle is parked, the third voltage of the first battery group to the first voltage;
converting, by the system using a fourth DC-DC converter, while the vehicle is parked, the fourth voltage of the second battery group to the second voltage;
coupling or decoupling, by the system using a first switch based on a first signal from a control component, the first battery group from a propulsion load, wherein the first switch is connected to a positive terminal of the first battery group; and
coupling or decoupling, by the system using a second switch based on a second signal from the control component, the second battery group from the propulsion load, wherein the second switch is connected to a negative terminal of the second battery group.

19. The method of claim 18, wherein the first voltage comprises 12 volts.

20. The method of claim 18, wherein the first voltage comprises 48 volts.

* * * * *